March 13, 1945.  W. F. MUNN  2,371,405
GAS ANALYSIS APPARATUS
Filed Dec. 2, 1942
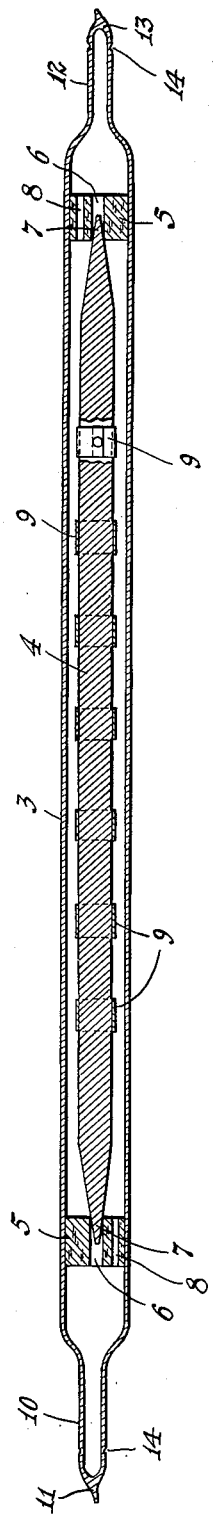
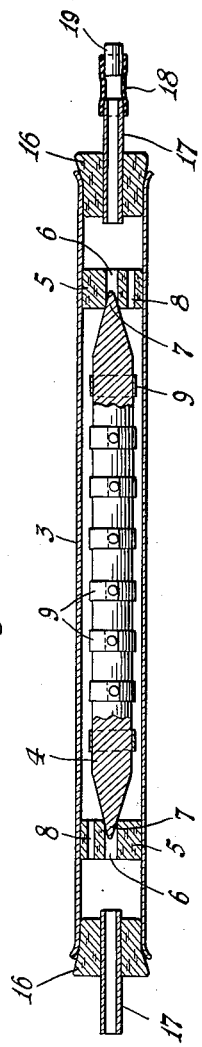
INVENTOR.
WILLIAM F. MUNN
BY
Ramsey, Kent and Chisholm Patented Mar. 13, 1945

2,371,405

UNITED STATES PATENT OFFICE 2,371,405

GAS ANALYSIS APPARATUS

William Faitoute Munn, West Orange, N. J.

Application December 2, 1942, Serial No. 467,600

2 Claims. (Cl. 23—254)

This invention relates to devices for use in detecting gases, though its essential features may also be used for making quantitative determinations of gases. By "gases" I mean not only dry gases, but also air or other gas laden with vapors or finely divided liquid in suspension.

A prime object of the invention is to provide a structure of this general character in which the gas or fluid under test is caused to have desirably rapid and effective contact with a test element or elements forming part of the device, such test elements being preferably what are known as test papers.

Another object is to provide a structure in which is carried a plurality of test papers, each responsive to a different gas or fluid that may be passed through the device.

In one of its aspects the invention provides a tubular casing or container of small size, e. g., of dimensions not differing greatly from those of an ordinary lead pencil, transparent or opaque, with a supporting rod mounted therein so that there is very little clearance between it and the casing walls, and with a test paper or papers carried by and partially or completely encircling the rod so that fluid passing through the casing will make most effective contact with the test paper or papers, the casing being normally sealed at its ends, which may however be opened to permit ingress and egress of the fluid. In one form of the device the tube may be positively hermetically sealed at its ends, and/or capable of but a single use because it is not feasible to equip the rod with fresh test papers after the tube has once been sealed. Another form of the device provides conformations, relations of parts, and removable and re-attachable end-closures for the casing, to permit of the ready insertion into or withdrawal from the casing of the, or an appropriate, supporting rod carrying its desired equipment of test paper or papers.

Other objects, aims, and advantages of the invention will be apparent from the following description of the elements and combination and arrangement of parts constituting the invention and taken in connection with the drawing forming a part hereof, and in which Fig. 1 is a central longitudinal section of one form of device embodying my invention, and Fig. 2 is a similar view of a modified form thereof.

Referring to the numerals on the drawing, and particularly to Fig. 1, there is shown at 3 a tube or casing which may be of any transparent material, preferably glass. The casing is shown as of approximately full size, and within it is carried a rod or core 4 (of material suitably inert for the purposes of the device) that is to be supported within the casing so that it lies substantially parallel to the axis of the casing and spaced from but relatively close to the interior walls of the casing. This mounting is accomplished by means of two discs 5, of cork or other suitable material, each being centrally apertured as at 6 to receive a pointed end 7 of the rod 4, and each disc being also provided with a slit or aperture 8 for the passage of gas therethrough. It will be understood that the tube 3 is initially cylindrical from end to end, and that in assembling the parts one of the discs 5 is first inserted from one end of the tube to the proper distance into the tube, then the rod 4 is shoved into the tube from the opposite end of the tube until one of the pointed ends 7 enters the central aperture 6 of the disc 5 that has been positioned as aforesaid; then another disc 5 is shoved in from the opposite end of the tube, with its central aperture 6 engaging the other end of the rod 4. The rod or core 4 may be generally cylindrical or it may have some other shape in cross-section, e. g., hexagonal, etc.; and the rod or core carries one or more test papers indicated at 9, each such test paper encircling the rod, with its end overlapped and held in place as by means of a small tack, or by some suitable adhesive, or otherwise. In Fig. 1, seven of such test papers are shown on the rod, and they are suitably spaced as shown. Each test paper may be provided with a number or other identifying indicium embossed or printed thereon, and if the device, assuming that there is a plurality of test papers, is intended for use in detecting one of a plurality of gases, each test paper will be responsive to a particular gas passing through the tube, the presence of that gas being manifested by visual change in one or another of the test papers, resulting from reaction between the gas and that test paper. If the device is to be used for making quantitative determinations of a single known gas (as, for example, hydrogen sulphide), I will use a single test paper extending the full length of the rod.

If it is desired to protect the test papers against deterioration, the tube may be evacuated. This is accomplished by drawing down one end of the tube, as indicated at 10, and sealing it off as indicated at 11, then drawing down the other end of the tube as indicated at 12, pulling a vacuum through this constricted end, and then sealing off as indicated at 13.

In the use of the Fig. 1 device, the sealed ends 11 and 13 are broken off (weakened lines 14 being provided to facilitate this operation) and a quantity of the gas under test is caused to pass through the tube in an obvious manner. By reason of the fact that the test papers on the supporting rod are relatively close to the inner wall of the tube, the gas will have most effective contact with the test papers in its path, and because of the small size of the device, the minimum of gas will need to be put through the tube. Obviously the Fig. 1 device will be good for but one test, because as a practical matter the rod cannot be removed without breaking the tube.

In the Fig. 2 form of the device, the structure is in general the same, except that the ends of the tube are not drawn down and hermetically sealed as in Fig. 1. Instead, the ends of the tube are plugged by means of suitable plugs 16, each of which carries a tubule 17 passing centrally therethrough, this tubule being again closed off by means of a rubber sleeve 18 whose outer end is plugged with a suitable plug 19. In the use of the Fig. 2 device, the sleeves 18 are removed, whereupon one or the other of the tubules 17 is connected to the source of gas under test, and the gas caused to pass through the device. This Fig. 2 form has the advantage that by removing the plugs 16, the parts inside the tube may be shoved out so that the rod 4 may be equipped with fresh test papers after each use of the device. Also, with the Fig. 2 device, the tube 3 need not necessarily be transparent, because after the gas under test has been passed through the device, the ends of the tube may be opened and the rod with its test papers removed for reading. With either the Fig. 1 or Fig. 2 form of the device, the results of a test can be read with facility regardless of how the device and/or the rod 4 is held in the hand or presented to the eye.

In view of the foregoing, it is to be understood that the invention can be modified beyond the illustrated embodiments, and therefore is to be limited only by the scope of the following claims.

I claim:

1. A gas testing device, comprising: an elongated transparent tube sealed at its ends and adapted to have the seals broken for use, centrally apertured plugs in the tube, one adjacent each end, the plugs each also having another aperture to permit passage of gas therethrough, an elongated rod in the tube having ends in the central apertures for support, the rod being coaxial with the tube and being of such diameter as to leave but a relatively small annular passageway between the rod and the tube wall, and a plurality of testing strips encircling the rod, the testing strips having different characteristics adapting them to react selectively to different gases.

2. A gas testing device, comprising: an elongated transparent tube sealed at its ends and adapted to have the ends opened for use, an elongated rod in the tube and extending lengthwise thereof, the rod being spaced from the wall of the tube and being of such diameter as to leave but a relatively small annular passageway between the rod and the tube wall, a pair of rod-supports holding the rod in said spaced relation to the wall of the tube, one rod-support being positioned adjacent to each end of the rod, each rod-support bridging the space between the tube wall and the rod, and each rod-support being perforated for the passage of gas, and a plurality of testing strips extending circumferentially of the rod, the testing strips having different characteristics adapting them to react selectively to different gases.

WILLIAM FAITOUTE MUNN.